(## United States Patent [19]

van der Kallen

[11] 4,255,464
[45] Mar. 10, 1981

[54] METHOD FOR THE MANUFACTURE OF OBJECTS FROM AN UNSATURATED POLYESTER COMPOSITION

[75] Inventor: Ludovicus H. van der Kallen, Bergen op Zoom, Netherlands

[73] Assignee: Akzo N.V., Arnhem, Netherlands

[21] Appl. No.: 974,240

[22] Filed: Dec. 29, 1978

[30] Foreign Application Priority Data

Dec. 30, 1977 [NL] Netherlands .......................... 7714570

[51] Int. Cl.³ ............................................... B05D 3/06
[52] U.S. Cl. ............................... 427/54.1; 204/159.15; 204/159.19
[58] Field of Search ............... 427/44, 54; 204/159.11, 204/159.14, 159.15, 159.19

[56] References Cited

U.S. PATENT DOCUMENTS

| | | | |
|---|---|---|---|
| 3,531,317 | 9/1970 | Patheiger et al. ....................... | 427/54 |
| 3,840,448 | 10/1974 | Osborn et al. .......................... | 427/54 |
| 3,943,046 | 3/1976 | DeSorga et al. ........................ | 427/54 |

FOREIGN PATENT DOCUMENTS 51-96834  2/1975  Japan .................................. 204/159.11

*Primary Examiner*—John H. Newsome
*Attorney, Agent, or Firm*—Stevens, Davis, Miller & Mosher

[57] ABSTRACT

The invention relates to a method for the manufacture of objects having a thickness of at least 2 mm from an unsaturated polyester composition, in which the emission of ethylenically unsaturated monomer during the processing of the polyester composition is limited by exposing the latter to UV-radiation with a low-pressure UV-lamp, after which the composition is cured under the influence of a radical initiator at a temperature lower than 70° C.

6 Claims, No Drawings

METHOD FOR THE MANUFACTURE OF OBJECTS FROM AN UNSATURATED POLYESTER COMPOSITION

This invention relates to a method for the manufacture of objects having a thickness of at least 2 mm from a polyester composition which includes, besides an unsaturated polyester, an ethylenically unsaturated monomer, an aromatic carbonyl compound as photoinitiator, a radical initiator and an accelerator. The use of unsaturated polyester compositions in the manufacture of, inter alia, tanks, pipe lines and ships, which is usually done in enclosed work spaces, is attended with great problems in connection with the emission of ethylenically unsaturated monomer, generally styrene. Despite the use of an effective and hence complex exhaust system, which has been considered to be the only feasible procedure, the work space contains so much of the monomer that fewer and fewer people are prepared to work under these conditions. The use has therefore been considered of relatively expensive dimethacrylic esters of an alkoxylated bisphenol compound instead of polyester compositions. An object of the invention is to provide a processing method for the unsaturated polyester compositions which displays the above-mentioned drawbacks to a considerably reduced degree.

The manufacture of objects from an unsaturated polyester composition, is usually carried out by employing a "hand-lay up" technique, in which by hand reinforcing material is impregnated with the polyester composition on a mould. In order that the object may have sufficient wall thickness, as a rule 2 to 50 mm, a relatively large number of layers, for instance 2 to 60 layers, must be provided. But the polymer composition also may be processed by spraying, winding, centrifuging or casting. All these processing techniques are attended with a very high emission of the ethylenically unsaturated monomer used. Another object of the invention is to limit the emission of the ethylenically unsaturated monomer to an acceptable level by exposing the polyester composition, after it has been applied, to radiation for a short time with ultraviolet light.

The method according to the present invention is characterized in that after the polyester composition has been applied, it is in a first step exposed to radiation with a low-pressure ultraviolet lamp to reduce the emission of the ethylenically unsaturated monomer and subsequently in a second step cured under the influence of the radical initiator, at a temperature lower than 70° C.

It should be added that the Netherlands Patent Application No. 291 123 describes a method for curing unsaturated polyester compositions, in which in a first step the composition is subjected to $\beta$-radiation and in a second step heated to a temperature in the range of 121° to 149° C. The German Patent Application No. 2 259 161 describes the curing of UV-curable polyester compositions with the use of stannous compounds as accelerator and a naphthalene sulphonyl chloride as photoinitiator.

Besides the great advantage of the present method, which resides in the considerable reduction of the emission of the ethylenically unsaturated monomer, there is the advantage over the method in which the polyester composition is fully cured by ultraviolet light that less photoinitiator is required as a result of which the present method is far less costly. Another advantage of the method of this invention consists in that in the preferably applied layered construction of the object the top layer will remain slightly sticky, so that adhesion to it of a following layer will give no problems. Moreover, the process according to the invention allows of building up and curing thicker laminates than in the case where the objects are cured in a conventional manner by means of ultraviolet light and it does not call for special treatments such as abrading or roughening a previously obtained surface. The advantage of the use of a low-pressure UV lamp over that of, for instance, a high-pressure UV lamp is that no special safety precautions need be taken. Important advantages of the low-pressure UV lamp are its low installation and purchasing costs and its low energy consumption.

The unsaturated polyester can be prepared in any convenient manner and is generally composed for one or more aliphatic and/or cycloaliphatic, mono-, di- and/or polyvalent alcohols and one or more aliphatic, cycloaliphatic and/or aromatic di- or polyvalent carboxylic acids and, optionally, one or more monovalent carboxylic acids and/or esters therof. As examples of suitable alcohols may be mentioned benzyl alcohol, ethylene glycol, propylene glycol, neopentyl glycol, hexane diol, dimethylol cyclohexane, 2,2-bis-(4-hydroxycyclohexyl)-propane, 2,2-bis-(p-phenyleneoxyethanol)-propane, 2,2-bis-(p-phenyleneoxypropanol-2)-propane, diethylene glycol, glycerol, trimethylol ethane, trimethylol propane, pentaerythritol and/or dipentaerythritol. Instead of or besides the alcohol compound(s) one or more epoxy compounds may be used, for instance ethylene oxide, propylene oxide, epoxy propanol and isodecanoic glycidyl ester. As examples of suitable di- or polyvalent carboxylic acids may be mentioned maleic acid, fumaric acid, itaconic acid, citraconic acid, malonic acid, succinic acid, glutaric acid, adipic acid, azelaic acid, sebacic acid, tetrahydrophthalic acid, hexahydrophthalic acid, hexachloroendomethylene tetrahydrophthalic acid, dichlorophthalic acid, isophthalic acid, terephthalic acid and/or trimellitic acid. The carboxylic acid also may be used in the form of an anhydride, for instance: maleic anhydride or phthalic anhydride. It is preferred that as dicarboxylic acid maleic anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids and polyvalent alcohols such as glycerol. As examples of suitable monocarboxylic acids may be mentioned fatty acid precondensates having 5 to 10 carbon atoms, heptanoic acid, pelargonic acid, isononanoic acid, lauric acid, stearic acid, oleic acid, linoleic acid, linolenic acid, cerotic acid, benzoic acid, tert. butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with for instance an organic solvent such as toluene or xylene, after which generally the volatile constituents are to the desired extent removed in vacuo.

As ethylenically unsaturated monomer any usual monomer may be employed. As examples of suitable monomers may be mentioned styrene, $\alpha$-methyl styrene, vinyl toluene, divinyl benzene, diallyl phthalate and acrylic or methacrylic (hydroxy)esters of alcohols having 1 to 12 carbon atoms such as methanol, ethanol, propanol, butanol, ethylene glycol, propylene glycol, neopentyl glycol, butane diol, hexane diol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

The composition further contains one or more photoinitiators in an amount of 0.03 to 0.3% by weight, based on the polyester resin and the monomeric compound(s). Amounts higher than 0.3% by weight cause too rapid drying of the resin surface, so that in a layered construction of the object to be made there will be insufficient adhesion of the following resin layer. The photoinitiators to be used are aromatic carbonyl compounds such as bonzoin and ethers thereof, such as the methyl ether, the ethyl ether, the propryl ether and the tert. butyl ether, benzil, benzildimethylketal, acetophenone, substituted acetophenones such as diethoxyacetophenone, benzophenone, substituted benzophenones, Michler's ketone and chlorothioxanthone. It is preferred that benzildimethylketal should be used. The duration of exposure to UV light is dependent on the specific structure of photoinitiator and the UV lamp used and is generally in the range of ½ to 30 minutes, and preferably 3 to 15 minutes.

The actual curing of the polyester composition according to the invention takes place in the presence of a radical initiator and an accelertor at a temperature lower than 70° C. The curing generally takes place without supplying external heat and the curing temperature is only little higher than the ambient temperature as a result of only little heat being released during the polymerization reaction.

As radical initiator any suitable compound may be used; for instance: diacyl peroxides such as benzoyl peroxide and acetyl peroxide; ketone peroxides such as methylethyl ketone peroxide, cyclohexanone peroxide and acetylacetone peroxide; aldehyde peroxides such hydroxyheptyl peroxide and dibenzal diperoxide; hydroperoxides such as tert. butyl hydroperoxide and cumene hydroperoxide; alkyl peresters such as tert. butyl perbenzoate and tert. butyl peracetate; alkyl peroxides such as tert. butyl peroxide and cumyl peroxide; and compounds such as alkyl peracids and acetal peroxides. The radical initiator is usually present in the composition in an amount of from 0.4 to 4% by weight, based on the polyester resin and the monomeric compound(s).

As accelerators of the radical initiators may be employed the usual compounds, for instance those that respectively contain cobalt, manganese, copper, iron, zirconium or vanadium. Also applicable are amines; for instance: dimethyl aniline, diethyl aniline, dimethyl paratoluidine and diethylamine, more particularly in combination with benzoyl compounds such as benzoyl peroxide. As examples of other suitable compounds may be mentioned mercaptans, C—C initiators, for instance: 1,2-diaryl-1,2-dicyan-1,2-diethoxycarboxyethane and compounds such as dihydroxymaleic acid and ascorbic acid.

The polyester composition usually contains one or more reinforcing materials, for instance: glass fibres; glass filaments, which can be applied in the form of mats and/or fabrics; asbestos; sisal and fibres, threads, mats and/or fabrics of carbon, metals and synthetic materials such as polyesters and aromatic polyamides.

The low-pressure UV lamp by which the polyester composition according to the invention is radiated may be of any usual type. The low-pressure UV lamps are generally characterized by low energy consumption, for instance less than 5 W per $cm^2$ maximum sectional area of the UV lamp. As representative examples may be mentioned those that are marketed by Philips under the trade marks TL/03, TL/0.5, TL/08, TL/09, TL/12 and T UV. The wave length of the ultraviolet light used is as a rule in the range of 250 to 600 nm. Normally, however, the above-envisaged lamps are only employed for cosmetic and health purposes and for illumination. They are generally not suitable to be used for curing polyester compositions (see for instance the comparitive part of Example I). The distance from the lamp(s) to the polyester laminate may be varied between wide limits, for instance between about 7 and 140 cm. Relatively long distances may be used in spite of the preferred low concentration of 0.03 to 0.3% by weight of photoinitiator.

Besides the above-mentioned components the polyester composition may contain other usual additives and adjuvants such as fillers, for instance: sand, quartz ground, chalk and talc.

The invention is further described in but not limited by the following examples. The hardness of the surfaces was determined with a Barcol No. 934-1 impressor in accordance with ASTM D 2583-67, at a temperature of 23° C. The resistance of the surface to a penetrating metal indentor was measured. A low-viscous layer has a hardness O.

EXAMPLE I

64 Parts by weight of an unsaturated polyester composed from 1.0 mole of monopropylene glycol, 0.14 moles of diethylene glycol, 0.50 moles of maleic anhydride and 0.50 moles of phthalic anhyride were dissolved in 36 parts by weight of styrene. To the resulting mixture there were added 0.1 part by weight of benzildimethyl ketal, 2 parts by weight of methylethyl ketone peroxide and 0.5 parts by weight of a cobalt naphthenate solution containing 1% by weight of cobalt. In a period of 3 minutes the composition obtained was made into 2 laminates, each laminate consisting of 2 layers of glass mat of 30×30 cm and a weight of 450 g/$m^2$. Subsequently, one of the laminates was exposed for 5 minutes to radiation with a low-pressure UV lamp TL-AK 40 W/05 (Philips), after which the two laminates were placed in an open vessel measuring 46×44×11 cm. The distance from the lamp to the laminate was 10 cm.

Next, the styrene concentration was measured at 11 cm above the laminates respectively 3, 5, 15, 25 and 40 minutes after they had been placed in the vessel. The values found are expressed in parts per million and are listed in Table 1.

TABLE 1

| Time in vessel (min.) | Non-radiated laminate (comparison) | Radiated laminate |
|---|---|---|
| 3 | 300 | 100 |
| 5 | 300 | <40 |
| 15 | 200 | <40 |
| 25 | 160 | <40 |
| 40 | 130 | <40 |

For comparison, the procedure of Example I was repeated, except that the polyester composition was used in the absence of cobalt naphthenate and methylethyl ketone peroxide. The values obtained for styrene emission likewise mounted to 100, <40 and <40 parts per million (Comparative Example A). Upon being left for 24 hours at 23° C., however, this laminate was entirely liquid on its non-radiated side, whereas upon use of the complete polyester composition the hardness of the laminate on its non-radiated side was 32.

EXAMPLE II

The procedure of Example I was repeated, but in such a way that use was made of an unsaturated polyester composed from 1.0 mole of monopropylene glycol, 0.49 moles of maleic anhydrid and 0.49 moles of isophthalic acid, and of which polyester 58 parts by weight were dissolved in 42 parts by weight of styrene. The peroxide used here was acetylacetone peroxide. The values measured for the styrene concentration are listed in Table 2.

TABLE 2

| Time in vessel (min.) | Non-radiated laminate (comparison) | Radiated laminate |
| --- | --- | --- |
| 3 | 400 | 120 |
| 5 | 400 | 100 |
| 15 | 350 | 60 |
| 25 | 200 | <40 |
| 40 | 160 | <40 |

EXAMPLE III

64 Parts by weight of the unsaturated polyester according to Example I were dissolved in 36 parts by weight of styrene, after which there were added 0.1 part by weight of benzildimethyl ketal, 2 parts by weight of methylethyl ketone peroxide, 1 part by weight of cobalt naphthenate solution containing 1% by weight of cobalt and 80 parts by weight of calcium carbonate. In a period of 2 minutes this composition was cast into 2 test specimens measuring 30×30×1 cm. Subsequently, one of the test specimens was exposed to 5 minutes' radiation with a low-pressure UV lamp TL-AK 40 W/05 (Philips), after which the two specimens were placed in an open vessel measuring 46×44×11 cm. The distance from the lamp to the test specimen was 10 cm. Next, the styrene concentration was measured at 11 cm above the specimens respectively 3, 5, 15, 25 and 28 minutes after they had been placed in the vessel. The values found are expressed in parts per million and are given in Table 3.

TABLE 3

| Time in vessel (min.) | Non-radiated laminate (comparison) | Radiated laminate |
| --- | --- | --- |
| 3 | 280 | 90 |
| 5 | 260 | <40 |
| 15 | 170 | <40 |
| 25 | 110 | <40 |
| 38 | 50 | <40 |

What is claimed is:

1. In the processing of an assembly of laminae of reinforcing material impregnated with an unsaturated polyester composition which contains an ethylenically unsaturated monomer to form a cured unitary article at least two mm. thick which is impractical to enclose in an inert atmosphere to avoid contact with ethylenically unsaturated monomer emitted from the composition, the method which comprises initially exposing in air the assembly of impregnated reinforcing material containing 0.03 to 0.3% by weight of a photoinitiator based on the weight of polyester resin to ultraviolet radiation of a low pressure ultra-violet lamp having a wave length of 250 to 600 nm to reduce volatilization of said monomer into the surrounding atmosphere during the curing step, and thereafter curing the composition in the presence of a radical initiator and an accelerator at a temperature below 70° C.

2. The process of claim 1 wherein said impregnated laminae are stacked in a mold prior to exposure to said ultra-violet light.

3. The process of claim 2 wherein said impregnated laminae are fabric impregnated with the polyester composition.

4. The method of claim 1, characterized in that use is made of a polyester composition containing styrene as ethylenically unsaturated monomer.

5. The method of claim 1, characterized in that use is made of a polyester composition containing 2 to 55% by weight of ethylenically unsaturated monomer.

6. The method of claim 1, characterized in that the energy consumption of the low-pressure ultraviolet lamp is less than 5 W per $cm^2$ maximum sectional area of the UV lamp.

* * * * *